(12) United States Patent  (10) Patent No.: US 12,504,612 B2
Ban et al.  (45) Date of Patent: Dec. 23, 2025

(54) MICROSCOPE OBSERVATION SYSTEM

(71) Applicants: FANUC CORPORATION, Yamanashi (JP); I Peace, Inc., Palo Alto, CA (US)

(72) Inventors: Kazunori Ban, Yamanashi (JP); Satoshi Kinoshita, Yamanashi (JP); Koji Tanabe, Kyoto (JP); Ryoji Hiraide, Kyoto (JP)

(73) Assignees: FANUC CORPORATION, Yamanashi (JP); I PEACE, INC., Palo Alto, CA (US)

( * ) Notice: Subject to any disclaimer, the term of this patent is extended or adjusted under 35 U.S.C. 154(b) by 834 days.

(21) Appl. No.: 17/783,268

(22) PCT Filed: Mar. 18, 2020

(86) PCT No.: PCT/JP2020/012133
§ 371 (c)(1),
(2) Date: Jun. 8, 2022

(87) PCT Pub. No.: WO2021/186648
PCT Pub. Date: Sep. 23, 2021

(65) Prior Publication Data
US 2023/0010002 A1  Jan. 12, 2023

(51) Int. Cl.
*G02B 21/00* (2006.01)
*C12M 1/00* (2006.01)

(52) U.S. Cl.
CPC .............. *G02B 21/00* (2013.01); *C12M 1/00* (2013.01)

(58) Field of Classification Search
CPC ........ C12M 41/36; G02B 21/00; G02B 21/32; G02B 21/244
See application file for complete search history.

(56) References Cited

U.S. PATENT DOCUMENTS

2006/0128005 A1* 6/2006 Hasegawa .............. C12M 23/48
435/286.2
2007/0047071 A1 3/2007 Honda et al.
(Continued)

FOREIGN PATENT DOCUMENTS

EP  3009500 A1  4/2016
JP  200393041 A  4/2003
(Continued)

*Primary Examiner* — Jonathan M Hurst
(74) *Attorney, Agent, or Firm* — HAUPTMAN HAM, LLP

(57) ABSTRACT

A microscope observation system comprises a cell production device provided with a culture vessel in which cells or cell masses are cultured, a microscope device capable of observing an object including cells or cell masses, a conveying apparatus that conveys the microscope device to the cell production device, and an operating control section that sends a command to the conveying apparatus to temporarily move the conveying apparatus from a current position to a relay position and then to move the conveying apparatus to a target position when focusing the microscope device onto the object, wherein a first distance from the current position to the relay position is a distance necessary to drive an actuator by at least a predetermined amount in order to actuate a rotation shaft or a translation shaft of the conveying apparatus, and a second distance from the current position to the target position is a shorter distance than the first distance.

3 Claims, 6 Drawing Sheets

(56) References Cited

U.S. PATENT DOCUMENTS

| | | | |
|---|---|---|---|
| 2015/0070566 A1* | 3/2015 | Yoshida | ............... H04N 23/673 348/349 |
| 2017/0257569 A1 | 9/2017 | Amino et al. | |
| 2018/0127695 A1 | 5/2018 | Nam et al. | |

FOREIGN PATENT DOCUMENTS

| | | | |
|---|---|---|---|
| JP | 2006284858 A | 10/2006 |
| JP | 4183742 B1 | 11/2008 |
| JP | 2012524527 A | 10/2012 |
| JP | 201819685 A | 2/2018 |
| JP | 201966819 A | 4/2019 |
| WO | 2012020458 A1 | 2/2012 |
| WO | 2016051983 A1 | 4/2016 |

* cited by examiner

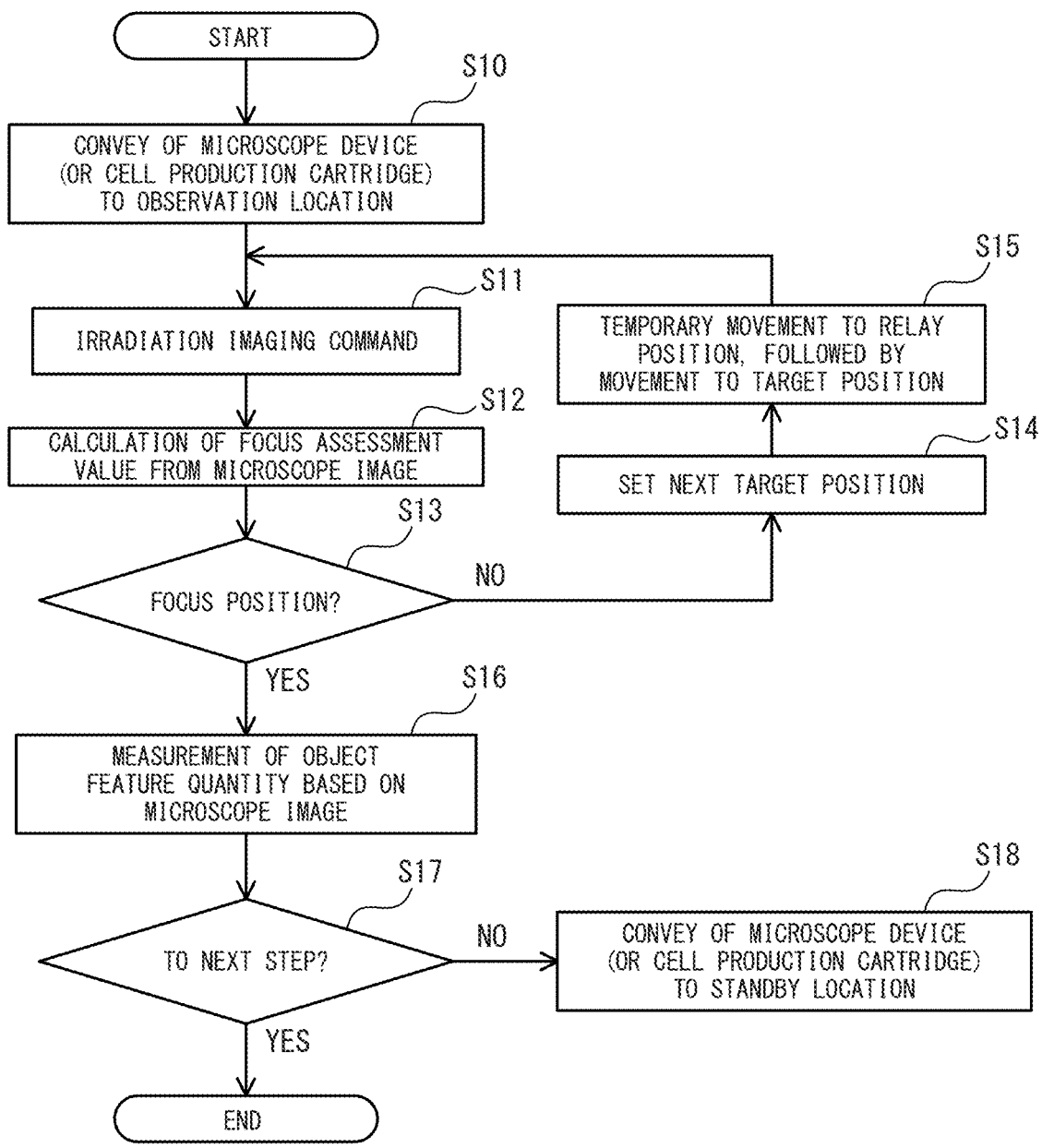

MICROSCOPE OBSERVATION SYSTEM

RELATED APPLICATIONS

The present application is a National Phase of International Application No. PCT/JP2020/012133, filed Mar. 18, 2020.

FIELD

The present invention relates to a microscope observation system, and specifically to a microscope observation system that streamlines cell production.

BACKGROUND

Embryonic stem cells (ES cells) are stem cells established from early embryo of a human or mouse, and have pluripotency allowing to differentiate into all cells present in a body. Human ES cells are considered to be usable in cell transplantation treatment for numerous diseases including Parkinson's disease, juvenile onset diabetes and leukemia. However, similar to organ transplantation, transplantation of ES cells has a problem of eliciting rejection. Moreover, many dissenting opinions have been raised from an ethical viewpoint against a use of ES cell lines that have been established by destruction of human embryos.

Prof. Shinya Yamanaka of Kyoto University succeeded in transferring the four genes: Oct3/4, Klf4, c-Myc and Sox2 into somatic cells, establishing induced pluripotent stem cells (iPS cells), and for that he received the 2012 Nobel Prize in Physiology or Medicine (see patent literature 1, for example). As ideal pluripotent cells free of the problem of rejection or ethical issues, iPS cells are expected to be useful in cell transplantation treatment.

Induced stem cells such as iPS cells are established by transferring inducing factors such as genes into cells which are then subjected to amplifying culturing and cryopreservation. However, in order to create iPS cells for clinical use (GLP or GMP grade), for example, it is necessary to use a cleanroom kept in a highly uncontaminated state, incurring high cost for maintenance. This has presented a problem for industrialization in terms of how to increase efficiency and reduce costs for operation of the cleanroom.

Moreover, creation of iPS cells is considerably dependent on manual operation, but few technicians with an ability to create iPS cells for clinical use are available. Another problem is that a series of operations from establishment of stem cells to their storage are complex. Culturing of cells for clinical use requires three steps: confirming Standard Of Process (SOP); manipulation according to SOP; and confirmation of whether or not the manipulation was conducted according to SOP. It is highly unproductive that these steps are carried out by human operators. Cell culturing also requires 24-hour management, and preservation of stem cells lasts for periods of many decades, and therefore, there has been a limit to management by human resources alone.

Enclosed cell production devices have been developed (see Patent literature 2, for example), that do not require highly uncontaminated cleanrooms and can be operated in normal controlled areas (for example, where either the microorganisms and microparticles are grade D level or higher based on the WHO-GMP standard). In order to avoid employing human resources and to automate complex steps of cell production, cell production systems have been developed that comprise a robot which aids in cell production. Multiple cell production devices are operated similarly in parallel, with the robot assisting cell production in the multiple cell production devices.

While cells are being produced in the cell production device, it is necessary to observe states of the cells in the culture vessel with a microscope and to perform various types of process control depending on a growth degree of cell mass, as necessary. Since cells or cell masses are thin like rice-crackers and are nearly colorless and transparent to naked eyes, it is difficult to clearly make out the number of cells constituting the cell mass or cell forms such as cell membranes and cell nuclei using a general stereomicroscope. It is common to use a microscope apparatus equipped with an observation system that allows cells or cell masses to be imaged with high contrast, such as a phase contrast observation system, differential interference contrast observation system, relief contrast observation system, fluorescent observation system, bright field observation system or dark field observation system. The following publications are known as technologies relating to such microscope observation systems for observation of cells or cell masses.

Patent literature 3 discloses a culture sample observation apparatus that takes a magnified image of a culturing instrument and displays it on the exterior of a culturing case. In this culture sample observation apparatus, as described in the publication, an imaging unit is provided in a culturing case in which a plurality of culturing instruments are arranged, and the imaging unit and culturing instrument are moved relative to each other in an orientation so that the desired culturing instrument is imaged by the imaging unit.

Patent literature 4 discloses a light transmission-type observation apparatus for observation of a culture sample in the chamber of an incubator. In a light transmission-type observation apparatus, as described in the publication, a light-emitting probe of an illumination apparatus and a light-incident probe of an optical device are linked to a reciprocating drive unit that moves both probes while maintaining their fixed relative positions along the surface of a sample observation unit.

Patent literature 5 discloses an apparatus in which cells are automatically cultured in parallel in a plurality of cell culturing vessels, specifically microtiter plates. An observation unit and a receptacle unit that receives the cell culturing vessels are situated in a housing, with the cell culturing vessels being automatically movable to an area of the observation unit by a carriage or robotic arm.

Patent literature 6 discloses a phase contrast observation apparatus. It is stated that the phase contrast observation apparatus includes a first moving unit capable of moving a light source and an illumination optical system, and a second moving unit capable of moving an imaging optical system.

CITATION LIST

Patent literature 1: Japanese Patent Publication No. 4183742
Patent literature 2: Japanese Unexamined Patent Publication No. 2018-019685
Patent literature 3: Japanese Unexamined Patent Publication No. 2003-93041
Patent literature 4: Japanese Unexamined Patent Publication No. 2006-284858
Patent literature 5: Japanese Patent Public Inspection No. 2012-524527
Patent literature 6: Japanese Unexamined Patent Publication No. 2019-66819

SUMMARY

Technical Problem

When a microscope device is focused on cells or cell masses, culture vessel and microscope device must be moved relative to each other by a few tens of micron units. However, when a common moving mechanism (or conveying apparatus) having a rotation shaft or a translation shaft connected through a speed reducer at the output side of an actuator including a servomotor or the like is operated in units of several tens of microns, drive power cannot be efficiently transmitted to a controlled target due to mechanical factors such as backlash arose between gears in the speed reducer, twisting (elastic deformation) of metal members, frictional force, or load, which either prevents the controlled target from being actuated or prevents the controlled target from precisely moving as intended. This phenomenon is generally referred to as "lost motion". The result is that it becomes impossible to accurately focus the microscope device.

A cell production device comprises a cell production cartridge including at least a culture vessel in which cells or cell masses are cultured, and a driving base that is connected to the cell production cartridge in a removable manner and drives the cell production cartridge, wherein the driving base is preferably operated basically as a fixed installation. Particularly when multiple cell production devices are operated simultaneously in parallel, a placement layout of the cell production devices is restricted and different cell production devices come to have different states of progress of cell production. Therefore, it is necessary to either convey the microscope device to the cell production devices or temporarily separate the cell production cartridge from the driving base to convey the cell production cartridge to the microscope device.

The focusing function for focusing a microscope device is generally implemented in the microscope device itself, whereas the conveyance function for conveying the microscope device or cell production cartridge is generally provided by the conveying apparatus itself. However, when the focusing function and conveyance function are provided on separate apparatuses, the microscope observation system become complicated and this leads to high production cost, increased production steps, malfunctioning troubles, etc.

There is a need for technology that streamlines the microscope observation system for cell production.

Solution to Problem

One aspect of the disclosure provides a microscope observation system comprising a cell production device provided with a culture vessel in which cells or cell masses are cultured, a microscope device capable of observing an object including cells or cell masses, a conveying apparatus that conveys the microscope device to the cell production device, and an operating control section that sends a command to the conveying apparatus to temporarily move the conveying apparatus from a current position to a relay position and then to move the conveying apparatus to a target position when focusing the microscope device onto the object, wherein a first distance from the current position to the relay position is a distance necessary to drive an actuator including a servomotor or the like by at least a predetermined amount in order to actuate a rotation shaft or a translation shaft of the conveying apparatus, and a second distance from the current position to the target position is a shorter distance than the first distance.

Another aspect of the disclosure provides a microscope observation system comprising a cell production cartridge provided with a culture vessel in which cells or cell masses are cultured, a microscope device capable of observing an object including cells or cell masses, a conveying apparatus that conveys the microscope device to the cell production cartridge or the cell production cartridge to the microscope device, and an operating control section that sends a command to the conveying apparatus to temporarily move the conveying apparatus from a current position to a relay position and then to move the conveying apparatus to a target position when focusing the microscope device onto the object, wherein a first distance from the current position to the relay position is a distance necessary to drive an actuator including a servomotor or the like by at least a predetermined amount in order to actuate a rotation shaft or a translation shaft of the conveying apparatus, and a second distance from the current position to the target position is a shorter distance than the first distance.

Yet another aspect of the disclosure provides a microscope observation system comprising a cell production cartridge provided with a culture vessel in which cells or cell masses are cultured, a driving base that is connected to the cell production cartridge in a removable manner and drives the cell production cartridge, a microscope device capable of observing an object including cells or cell masses, and a conveying apparatus that conveys the microscope device between an observation location of the microscope device and a standby location of the microscope device or conveys the cell production cartridge between an observation location of the microscope device and a standby location of the cell production cartridge.

Advantageous Effects of Invention

According to one or other aspects of the disclosure, a command is sent to the conveying apparatus to temporarily move the conveying apparatus from the current position to the relay position and then to move the conveying apparatus to a target position when focusing the microscope device onto the object. Since the first distance from the current position to the relay position is a longer distance than the second distance from the current position to the target position, backlash between gears in the speed reducer that drives the conveying apparatus is eliminated, and driving force (for driving the conveying apparatus) exceeds maximum static friction or load and is consequently transmitted to the controlled target. In other words, it becomes possible to reliably move the conveying apparatus (i.e. perform focusing).

According to another aspect of the disclosure, even when the driving base operates at a fixed location, the conveying apparatus itself can be provided with a focusing function of the microscope device and a conveyance function of the microscope device or cell production cartridge, thus allowing significant reduction in production costs, production steps and malfunctioning troubles especially when multiple cell production devices are operated simultaneously in parallel. In other words, it is possible to provide a technology that streamlines the microscope observation system for cell production.

BRIEF DESCRIPTION OF DRAWINGS

FIG. 4 is a flow chart showing an example of an operation of the microscope observation system.

DESCRIPTION OF EMBODIMENTS

Figure 1A:
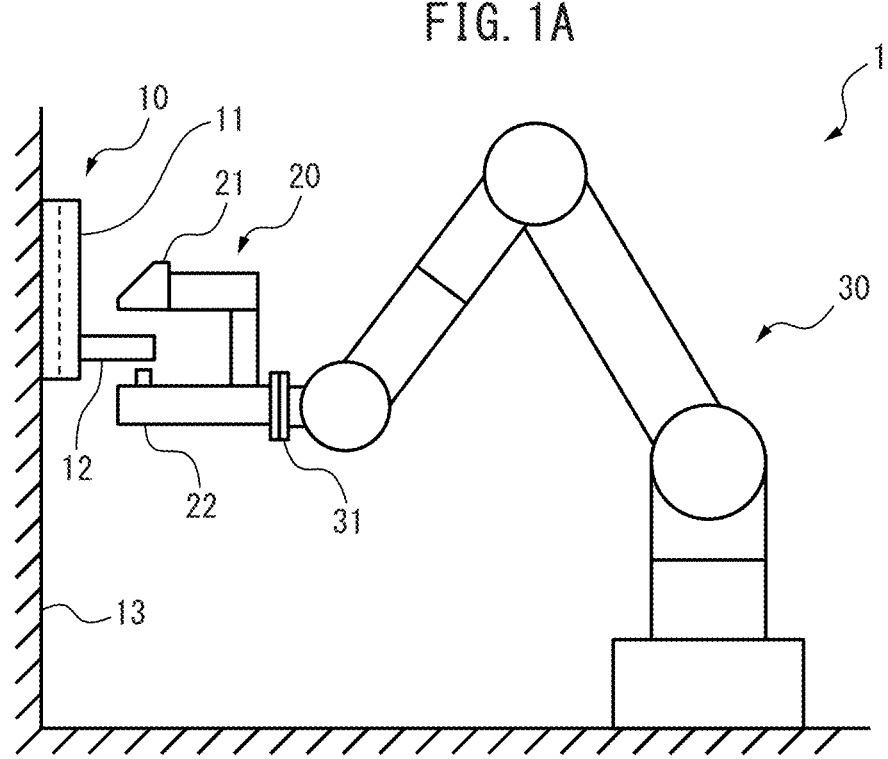
FIG. 1A is a schematic diagram showing a schematic construction of a microscope observation system according to an embodiment of the invention.

Embodiments of the disclosure will now be explained in detail with reference to attached drawings. In the drawings, same or similar constituent elements will be indicated by the same or similar reference numerals. The embodiments described below do not limit a technical scope of the invention as recited in the claims, or the definitions of terms. The term "closed", as used herein, means that contamination sources such as microorganisms and viruses do not enter into an apparatus so that biological contamination may not be caused, and/or that fluids (including substances such as cells, microorganisms, viral particles, proteins and nucleic acids) in the apparatus do not leak out so that cross-contamination may not be caused, and/or that a biohazard is not caused even when pathogen-infected donor fluids are handled in the apparatus. However, a cell production device described herein may be constructed to allow entrance of non-contaminating fluids such as carbon dioxide, nitrogen and oxygen into the apparatus, or leakage thereof out of the apparatus.

Figure 1B:
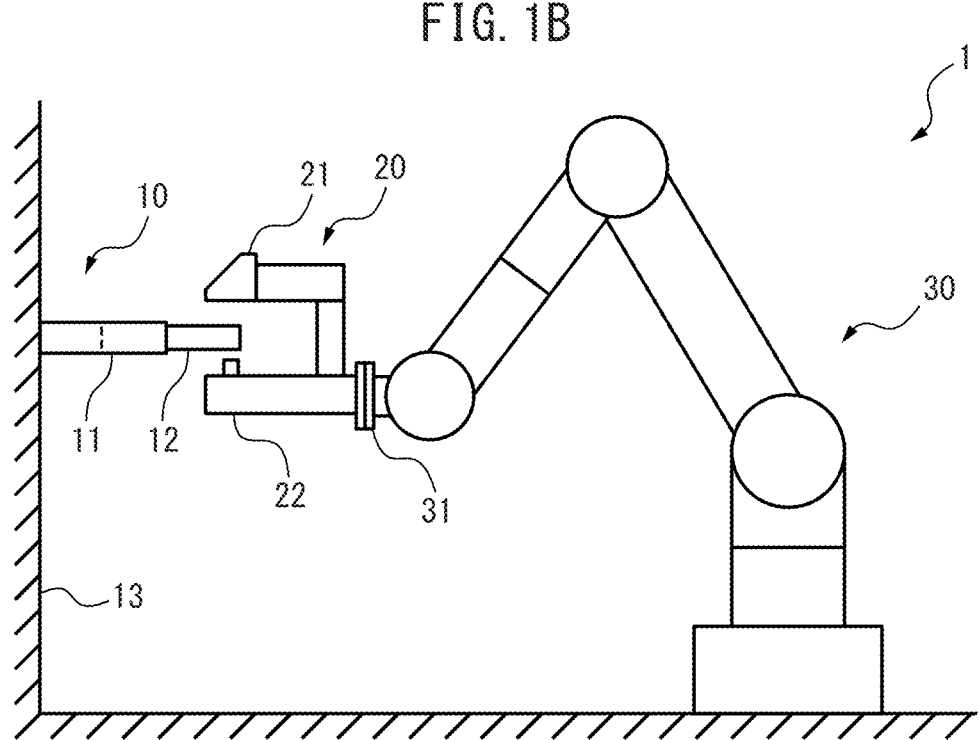
FIG. 1B is a schematic diagram showing a schematic construction of a microscope observation system according to an embodiment of the invention.
Figure 1C:
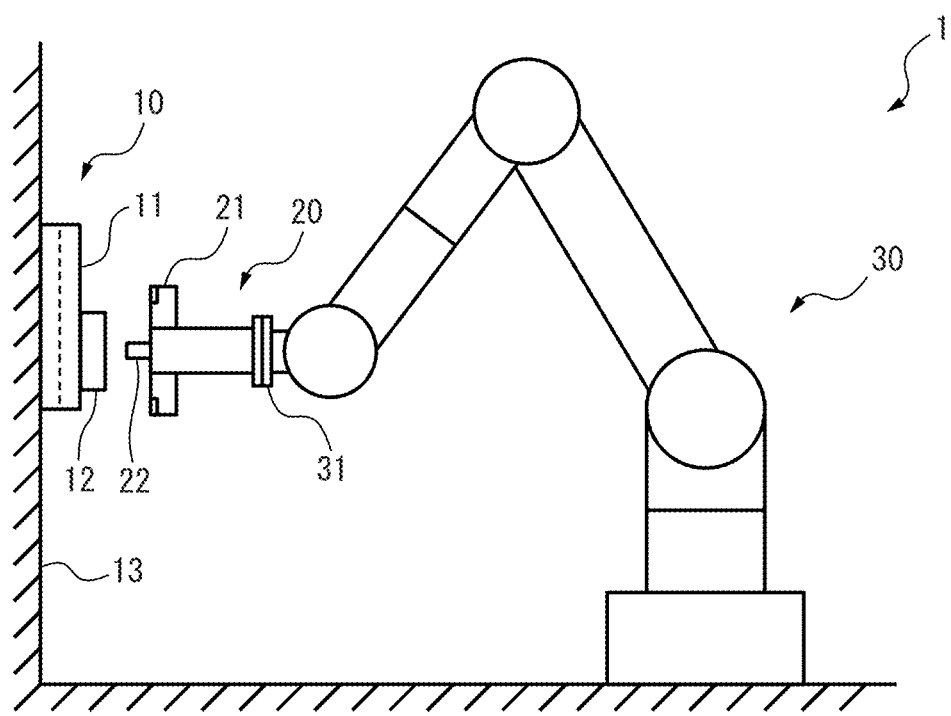
FIG. 1C is a schematic diagram showing a schematic construction of a microscope observation system according to an embodiment of the invention.

FIG. 1A to FIG. 1C are schematic diagrams showing a schematic construction of a microscope observation system 1 according to an embodiment of the invention. The microscope observation system 1 comprises a cell production device 10, a microscope device 20 and a conveying apparatus 30. The cell production device 10 produces target cells from source cells. Source cells include somatic cells such as blood cells and fibroblasts, or stem cells such as ES cells and iPS cells. Target cells include stem cells, progenitor cells, or final differentiated cells (fibroblasts, neurons, retinal epithelial cells, hepatocytes, β cells, renal cells, mesenchymal stem cells, blood cells, megakaryocytes, T cells, chondrocytes, myocardial cells, muscle cells, vascular cells, epithelial cells and renal cells, etc.). The cell production device 10 comprises numerous functional parts such as a separating function whereby source cells are separated from blood, skin or human embryos, a transfer function whereby a gene is transferred into the source cells, an inducing function whereby cells are induced by cell initialization, reprogramming, fate switching, direct reprogramming, differentiation switching, differentiation inducement or transformation, a culturing function whereby cells are cultured by initial culturing or amplifying culturing, a fragmenting function whereby cell masses are fragmented after culturing, and a cryopreservation function whereby target cells are cryopreserved. However, the cell production device may also be a cell culturing device with only a culturing function.

The cell production device 10 may comprise a cell production cartridge comprising at least a culture vessel in which cells or cell masses are cultured, and a driving base that is connected to the cell production cartridge in a removable manner and drives the cell production cartridge. In FIG. 1A to FIG. 1C, a boundary between the cell production cartridge and driving base is represented as a dotted line. The cell production cartridge comprises a fluid circuit in which multiple functional parts are highly aggregated, and a closable connector that is connected to the fluid circuit and connects a fluid container (such as a syringe or variable-volume bag) in a closed manner (not shown) to an exterior space. The fluid circuit is formed of a biologically safe material such as a resin or metal. The fluid circuit is integrally formed by die molding such as injection molding or compression molding, but alternatively the fluid circuit may also be integrally formed by modeling using a 3D printer, such as stereolithography, fused deposition layering, powder sintering, or ink-jet printing. The fluid circuit is formed by combining a fluid-flowing groove with a fluid storage vessel. The closable connector is a connector that connects the fluid circuit with an external variable-volume fluid container (such as a syringe or a variable-volume bag) and also closes the fluid circuit from the exterior space when the fluid container is removed from the connector. The closable connector includes an aseptic connector, a needle connector, a needleless connector, or a heat-shrinkable tube. A needleless connector may be a split septum type or a mechanical valve type. The fluid circuit may also comprise a variable-volume part (such as a syringe or variable-volume bag) storing fluid that is pushed or drawn out by a fluid that has been injected or discharged through the closable connector. The fluid circuit will thus be a closed system fluid circuit in which all of sections to be remained highly clean are internally aggregated, allowing the cell production device 10 to be used even in normally controlled areas.

The cell production cartridge comprises a main body 11, and a culture vessel 12 in which cells or cell masses are cultured. The cell production cartridge is integrally molded with a resin or the like, integrating the main body 11 and culture vessel 12, but alternatively the cell production cartridge may also have the culture vessel 12 in fluid connection with the main body 11 through the closable connector in a removable manner. The main body 11 is a plate-shaped device with height, width, and depth. The main body may be a vertical type where the height is greater than the depth, as shown in FIG. 1A and FIG. 1C, or a horizontal type where the depth is greater than the height, as shown in FIG. 1B. In order for the culture vessel 12 to be observed by the microscope device 20, at least part of observation area is formed of a transparent material such as a transparent resin or quartz glass, and at least part of observation area may protrude from the main body 11 in a horizontal direction. The culture vessel 12 may be an adhesion culture vessel (two-dimensional culture vessel) in which cells or cell masses are adhesion-cultured, as shown in FIG. 1A and FIG. 1B, or a suspension culture vessel (three-dimensional culture vessel) in which cells or cell masses are suspension-cultured, as shown in FIG. 1C. In the case of adhesion culturing (two-dimensional culturing), the culture vessel 12 may be a flat culture vessel for stationary culture, or a drum-shaped culture vessel for rotating culture. In the case of suspension culturing (three-dimensional culture), the culture vessel 12 may be a spinner flask, shake flask, or microcarrier spinner flask. The culture vessel 12 may also supply nutrients and reagents and discharge unwanted components, using a hollow fiber membrane or dialysis membrane.

The driving base preferably operates as a fixed installation installed on a wall structure 13. The wall structure 13 may be a cell surrounding the conveying apparatus 30 or a wall structure parallel to a line on which the conveying apparatus 30 is self-propelled. It is preferable that the wall structure 13 spatially separates a hazardous area side where the conveying apparatus 30 acts on the cell production device 10 and a safe area side on the opposite side from the hazardous area. The wall structure may also serve as a safety fence. The wall structure 13 is capable of arranging a plurality of the cell production devices 10, thus allowing an installation area of the cell production devices 10 to be reduced. In other words, this is similar to when multiple cleanrooms are arranged on single wall structure 13, and allows space reduction and cost reduction to be achieved.

The microscope device 20 is an optical microscope that allows observation of an object including cells or cell masses, but alternatively the microscope device may be an acoustic microscope. The microscope device 20 comprises an irradiation section 21 that irradiates observation waves onto the object, and an imaging section 22 that images observation waves transmitted through the object or observation waves reflected from the object. The microscope device 20 may be a transmission microscope in which the culture vessel 12 is inserted and observed between the irradiation section 21 and imaging section 22 as shown in FIG. 1A and FIG. 1B. Alternatively, the microscope device may be a reflective microscope in which the irradiation section 21 and imaging section 22 are disposed on the same side as shown in FIG. 1C. The microscope device 20 may be a microscope implementing any of various types of observation systems such as a phase contrast observation system, differential interference contrast observation system, relief contrast observation system, fluorescent observation system, bright field observation system, or dark field observation system. Depending on the observation system, the microscope device may comprise different optical systems such as an illumination source, condenser, objective lens, phase plate, differential interference prism and polarizing plate, or different acoustic systems such as a transducer and acoustic lens, as well as an image sensor.

The conveying apparatus 30 is a multi joint robot, but the conveying apparatus may also be a different type of mechanical device with a rotation shaft, such as a parallel link robot or humanoid, or a mechanical device equipped with a translation shaft, such as an orthogonal robot, shuttle, or automated guided vehicle. These may also be used in combination. The conveying apparatus 30 conveys the microscope device 20 constructed in a movable manner to the cell production device 10, but alternatively the conveying apparatus may convey a cell production cartridge removed from the driving base to the microscope device 20. That is, the conveying apparatus 30 may convey the microscope device 20 between an observation location of the microscope device 20 and a standby location of the microscope device 20, or alternatively the conveying apparatus may convey a cell production cartridge between the observation location of the microscope device 20 and a standby location of the cell production cartridge. The observation location is a place that allows the microscope device 20 to be focused onto the cells or cell masses in the culture vessel 12, while the standby location is a place that allows safe storage of the microscope device 20 or cell production cartridge. Especially, the standby location of the cell production cartridge may be a place attached to the driving base provided as a fixed installation. FIG. 1A and FIG. 1B show observation locations where a culture vessel 12 is inserted between the irradiation section 21 and imaging section 22 of a transmission microscope, whereas FIG. 1C shows an observation location where the irradiation section 21 and imaging section 22 of a reflective microscope are disposed on the same side relative to the culture vessel 12. When the conveying apparatus 30 is a robot that conveys the microscope device 20, the microscope device 20 may be mounted on or near a tip section 31 of the robot (for example on or near its flange) to be supported and conveyed, or alternatively the microscope device 20 may be held and conveyed by a robot hand (not shown). When the conveying apparatus 30 is a robot that conveys the cell production cartridge, the cell production cartridge may be held and conveyed by a robot hand (not shown).

Figure 2:
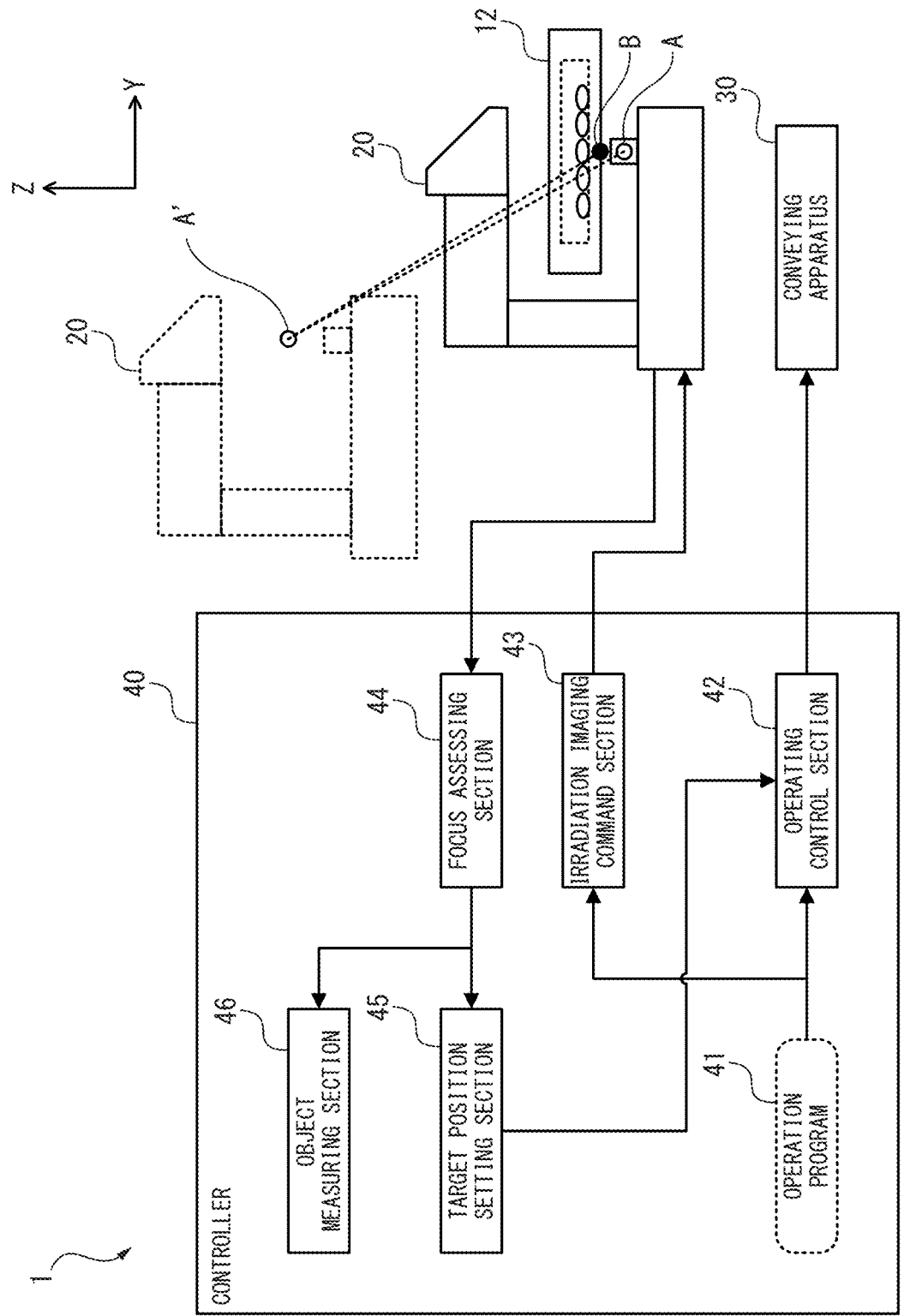
FIG. 2 is a block diagram showing an example of a control construction of the microscope observation system.

FIG. 2 shows an example of a control construction for a microscope observation system 1. The microscope observation system 1 further comprises a controller 40 that controls the microscope device 20 and conveying apparatus 30. The controller 40 is a computer device comprising a processor such as a CPU (central processing unit), but alternatively the controller may be a computer device comprising a semiconductor integrated circuit (IC) such as an FPGA (field-programmable gate array) or ASIC (application specific integrated circuit). The controller 40 comprises an operating control section 42 that sends an operating command to the conveying apparatus 30 according to an operation program 41, an irradiation imaging command section 43 that sends an irradiation imaging command to the microscope device 20 according to the operation program 41, a focus assessing section 44 that assesses, based on the microscope image, whether or not the microscope device 20 is focused onto the object after the conveying apparatus 30 has reached a target position, a target position setting section 45 that sets a next target position when it has been assessed that the microscope device is not focused onto the object, and an object measuring section 46 that measures a feature quantity of the object based on the microscope image, when it has been assessed that the microscope device is focused onto the object. These functional parts can be implemented by the processor or semiconductor IC in the controller 40, but alternatively these functional parts other than the operating control section 42 may be implemented by a processor or semiconductor integrated circuit in an external computer, instead of the controller 40.

The operating control section 42 sends a command to convey the microscope device 20 or cell production cartridge between the observation location of the microscope device 20 and the standby location of the microscope device 20 or cell production cartridge, to the conveying apparatus 30. The operating control section 42 also sends the conveying apparatus 30 a command to temporarily move the conveying apparatus 30 from a current position A to a relay position A' and then to move the conveying apparatus 30 to a target position B when focusing the microscope device 20 onto the object at the observation location. The first distance from the current position A to the relay position A' is a distance necessary to drive (rotate) an actuator including a servomotor or the like by at least a predetermined amount in order to actuate a rotation shaft or a translation shaft of the conveying apparatus 30, whereas the second distance from the current position A to the target position B is a shorter distance than the first distance. The predetermined amount referred to here is a fixed value that has been experimentally determined in advance. For setting of the focal point of the microscope device, the first distance may be for example several millimeters and the second distance may be for example several tens of microns. In this case the first distance will be a distance of several hundred times the second distance. Such operation control eliminates backlash between gears inside a speed reducer provided at output side of the actuator that drives the conveying apparatus 30, so that driving force exceeds a maximum static friction or load and is transmitted to the controlled target. In other words, the second distance from the current position A to the target position B is very short like several tens of microns, and the conveying apparatus 30 can therefore be precisely moved to the target position B because lost motion is avoided. By repeating such operations by the conveying apparatus 30 it is possible to focus the microscope device 20 onto the object.

The operating control section 42 also sends a command to move the conveying apparatus 30 in a direction such that a distance between the microscope device 20 and the object in the culture vessel 12 does not change when the observation point of the culture vessel 12 at the observation location is changed. In the example of FIG. 2, the conveying apparatus moves in the X-direction (not shown) or Y-direction which is perpendicular to the Z direction, i.e. the observation direction of the microscope device 20, thus allowing the observation point to be changed without changing the distance between the microscope device 20 and the object in the culture vessel 12. This allows the microscope device 20 to be more easily focused onto the object even after the observation point has been changed.

After the conveying apparatus 30 has reached the target position B, the irradiation imaging command section 43 sends an irradiation imaging command to the microscope device 20. The focus assessing section 44 assesses whether or not the microscope device 20 is focused onto the object based on the microscope image. The method of assessing focus using the focus assessing section 44 may be any of various methods, such as a gradient method including determining sizes of the brightness gradient in vertical and horizontal directions of given pixels, calculating a square root of the sum of squares thereof, and defining a position where the sum of the square for the entire image is maximum as a focused focal point; a high frequency method including calculating absolute values for second derivative of brightness for given pixels and defining a position where the sum of the absolute for the entire image is maximum as a focused focal point; or a brightness variance method including calculating a variance for brightness of the entire image and defining a position where the variance is maximum. For example, in the brightness variance method, the variance $\sigma^2$ is calculated from the microscope image based on the following formula, and the focus is assessed based on whether or not the variance $\sigma^2$ is above a predetermined threshold value. In the formula, I (x, y) is a brightness for each pixel, $\mu$ is an average brightness for the image, and M and N are respectively pixel counts in a width direction and height direction of the image. Hereafter, the variance $\sigma^2$ will be referred to as a focus assessment value for focus assessment.

$$\sigma^2 = \frac{1}{MN}\sum_{x=1}^{M}\sum_{y=1}^{N}[I(x, y) - \mu]^2$$

Mathematical Formula 1

Figure 3:
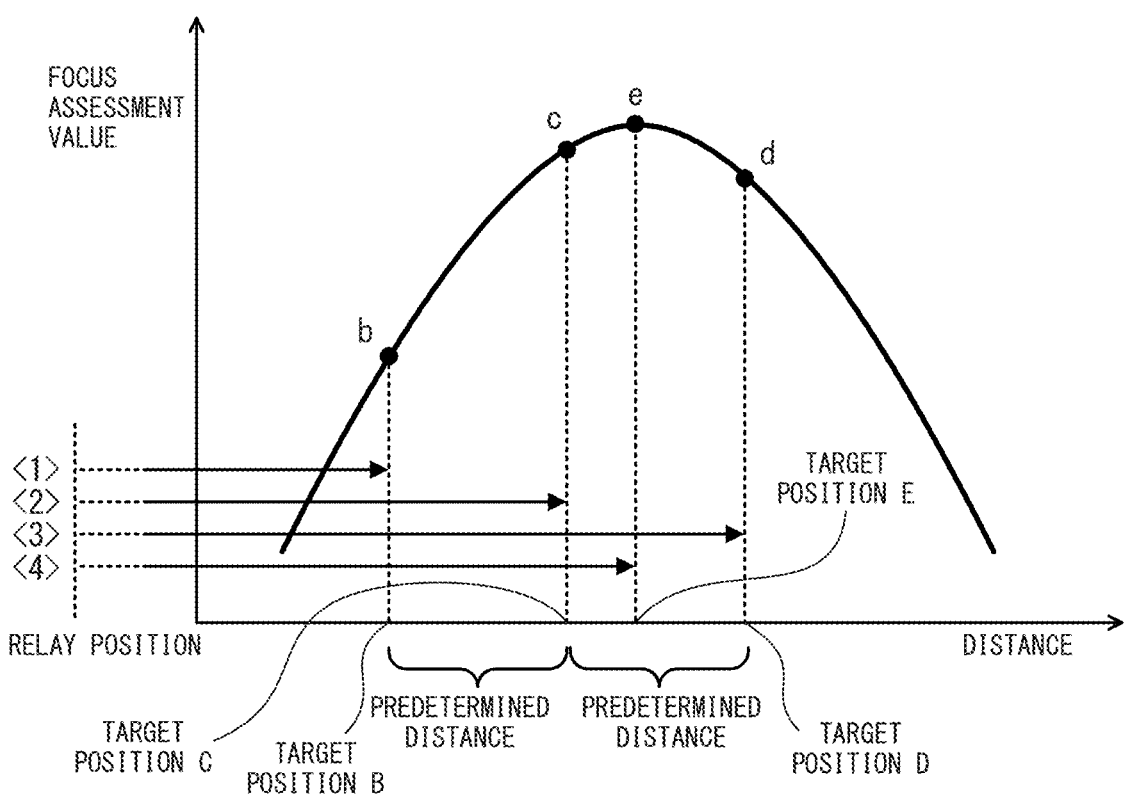
FIG. 3 is a graph showing an example of a method of setting a target position.

When it has been assessed that the microscope device is not focused onto the object, the target position setting section 45 sets next target position and sends the set target position to the operating control section 42. FIG. 3 shows an example of a method of setting the target position. The next target position B may be a position at a predetermined distance from the current position A along the observation direction (the Z direction in FIG. 2), the predetermined distance being a fixed value that has been experimentally determined in advance. Movement in the Z direction in FIG. 2 is actually movement in three-dimensional space, but in FIG. 3 the movement is represented conceptually as one-dimensional movement (on a horizontal axis of distance). First, the conveying apparatus is temporarily moved from a current position A to a relay position, and then moved to a target position B (operation <1> in FIG. 3). When the focus assessment value at the target position B (point b in FIG. 3) is not above a predetermined threshold value, the target position setting section 45 sets next target position C (a target position corresponding to point c in FIG. 3) at a further predetermined distance along the observation direction, and the conveying apparatus is temporarily moved to a relay position and then moved to the target position C (operation <2> in FIG. 3). When the focus assessment value c at target position C is above a predetermined threshold value, it may be assessed that the microscope device is focused onto the object at target position C. The following, however, is an example of a method for better determining a focus position. The target position setting section 45 sets next target position D (a target position corresponding to point d in FIG. 3) at a further predetermined distance along the observation direction, and the conveying apparatus is temporarily moved to a relay position and then moved to the target position D (operation <3> in FIG. 3). The focus assessment value d is obtained at the target position D. The obtained multiple focus assessment values b, c, d can be approximately fitted to multidimensional function (for example, a parabolic function). Since calculation methods for fitting multidimensional functions are known they will not be described here. Fitting a multidimensional function as shown in FIG. 3 allows a maximum value to be calculated as a focused point (point e in FIG. 3), and a position corresponding to that point becomes next target position E for the conveying apparatus. After the conveying apparatus has temporarily been moved to the relay position again, the conveying apparatus is moved to the target position E (operation <4> in FIG. 3). This allows the conveying apparatus to be moved to an optimal focused position.

Referring again to FIG. 2, when it has been assessed that the microscope device is focused onto the object, the object measuring section 46 measures a feature quantity of the object based on the microscope image. The feature quantity of the object may be, for example, a size of the cell or cell mass, cell count composing the cell mass, or a shape of the cell membrane or cell nuclei. When the feature quantity of the object is above a prescribed value the process continues to next step, whereas when the feature quantity for the object is not above the prescribed value the process does not continue to the next step, with the feature quantity of the object being again measured after a predetermined time has elapsed. If the feature quantity of the object is abnormal, cell production in the cell production device 10 may be halted or aborted.

FIG. 4 shows an example of operation of the microscope observation system 1. In step S10, the conveying apparatus 30 conveys the microscope device 20 (or the cell production cartridge) to the observation location. In step S11, the controller 40 sends an irradiation imaging command to the microscope device 20. In step S12, the controller 40 calculates the focus assessment value from the microscope image. In step S13, the controller 40 assesses whether or not the microscope device 20 is focused onto the object, based on the focus assessment value. When it has been assessed that the microscope device is not focused onto the object (step S13: NO), the process proceeds to step S14 and the controller 40 sets next target position. In step S15, the controller 40 sends a command to temporarily move the conveying apparatus 30 to the relay position and then to move the conveying apparatus 30 to the target position.

The process then returns to step S11, the controller 40 sends an irradiation imaging command to the microscope device 20 and the controller 40 calculates the focus assessment value from the microscope image for focus assessment in step S12 and step S13. When it has been assessed that the microscope device is focused onto the object (step S13: YES), the process proceeds to step S16 and the controller 40 calculates the feature quantity of the object based on the microscope image. After step S10 or step S16, the controller 40 may change the observation point of the culture vessel 12 by sending a command to move the conveying apparatus 30 in a direction that does not change the distance between the microscope device 20 and the object.

In step S17, the controller 40 assesses whether or not the process should proceed to next step based on the feature quantity of the object. When the feature quantity of the object is not above a prescribed value, the controller 40 assesses that the process should not proceed to the next step (step S17: NO), and in step S18, the conveying apparatus may convey the microscope device 20 (or the cell production cartridge) to the standby location thereof and again executes the flow chart after a predetermined time has elapsed. When the feature quantity of the object is above a prescribed value, the controller 40 assesses that the process should proceed to next step (step S17: YES), and operation of the microscope observation system 1 is ended. The steps executed by the controller 40 may be executed by an external computer (not shown) instead of the controller 40.

Figure 5A:
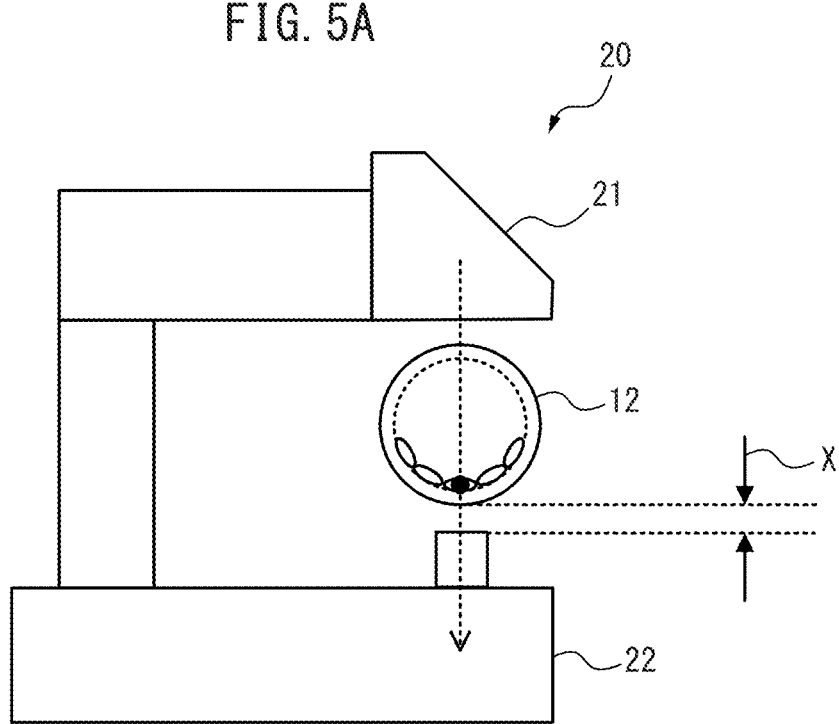
FIG. 5A is a side view of a modified example of a culture vessel.
Figure 5B:
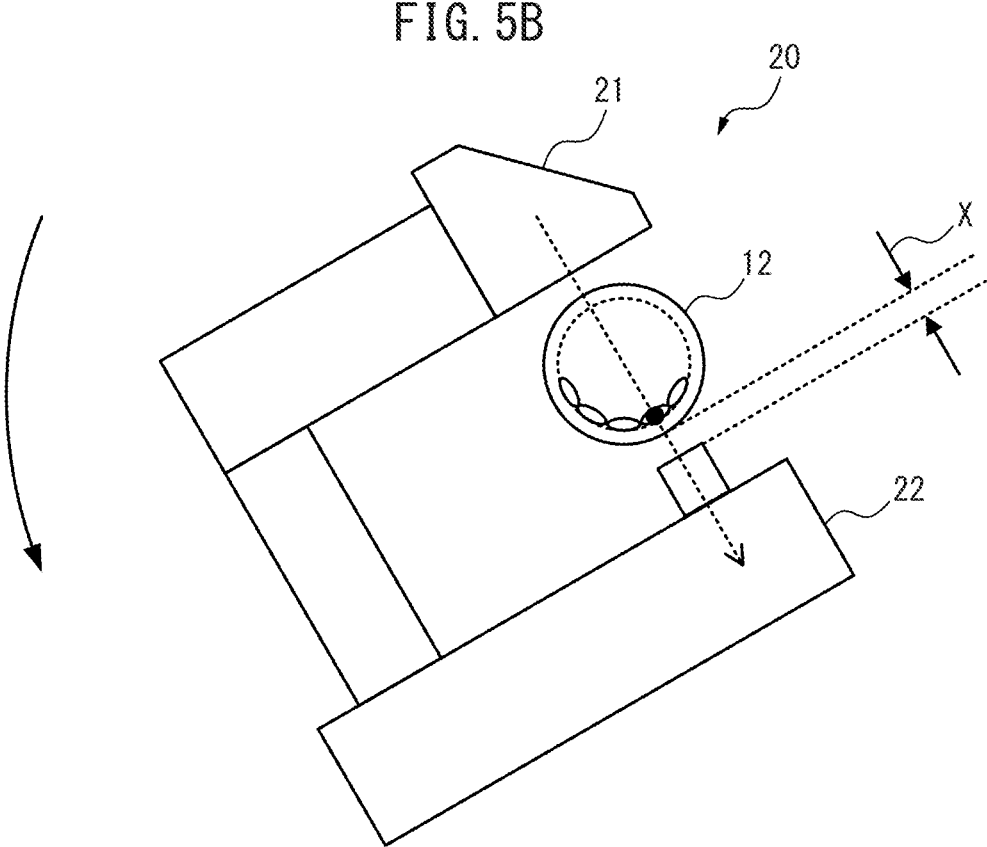
FIG. 5B is a side view of a modified example of a culture vessel.

FIG. 5A and FIG. 5B show modified examples of the culture vessel 12. The culture vessel 12 may also be a drum-type culture vessel instead of a flat culture vessel. The controller 40 may move the conveying apparatus 30 in a direction such that a distance between the microscope device 20 and the object of the culture vessel 12 does not change when the observation point is changed with a drum-type culture vessel. In other words, the controller 40 may rotate the microscope device 20 around a central axis of the drum-type culture vessel, thus moving the microscope device in a direction such that the distance between the microscope device 20 and the object of the culture vessel 12 (which may be distance X between the microscope device 20 and the outer circumference of the culture vessel 12 as shown in FIG. 5B, or a distance between the microscope device 20 and a cell adhesion surface of the culture vessel 12) does not change. FIG. 5A shows a posture of the microscope device 20 before changing the observation point, and FIG. 5B shows a posture of the microscope device 20 after changing the observation point. This allows the microscope device 20 to be more easily focused onto the object even after the observation point has been changed.

According to the embodiments described above, the conveying apparatus 30 is sent a command to temporarily move the conveying apparatus 30 from the current position to the relay position and then to move the conveying apparatus 30 to the target position when focusing the microscope device 20 onto the object at the observation location. Since the first distance from the current position to the relay position (for example, several millimeters) is a distance of several hundred times of the second distance from the current position to the target position (for example, several tens of microns), backlash between gears inside the speed reducer provided in the actuator that drives the conveying apparatus 30 is eliminated, and the driving force exceeds the maximum static friction or load and is consequently transmitted to the controlled target. In other words, it is possible to reliably move the conveying apparatus in fine amounts of several tens of microns.

Also, according to the embodiments described above, even when the driving base has been operated as a fixed installation, the conveying apparatus 30 itself can be provided with a focusing function of the microscope device and a conveyance function of the microscope device or cell production cartridge, thus allowing significant reduction in production costs, production steps and malfunctioning troubles especially when multiple cell production devices 10 have been operated simultaneously in parallel. In other words, it is possible to provide a technology that streamlines the microscope observation system 1 for cell production.

The program executed by the processor or the program that realizes the flow chart may be a program stored in non-transitory storage medium that is readable by a computer, such as a CD-ROM, or they may be distributed from a server on a WAN (wide area network) or LAN (local area network) by wired or wireless means.

The various embodiments described herein are not intended to limit the scope of the invention, and it will be recognized that various modifications may be made within the scope of the claims as recited below.

REFERENCE SIGNS LIST

1 Microscope observation system
10 Cell production device
11 Main body
12 Culture vessel
13 Wall structure
20 Microscope device
21 Irradiation section
22 Imaging section
30 Conveying apparatus
31 Tip section
40 Controller
41 Operation program
42 Operating control section
43 Irradiation imaging command section
44 Focus assessing section
45 Target position setting section
46 Object measuring section
A Current position
A' Relay position
B-E Target position

The invention claimed is:

1. A microscope observation system, comprising:
a cell production device comprising:
   a cell production cartridge including a culture vessel, in which cells or cell masses are cultured, and
   a driving base that is connected to the cell production cartridge in a removable manner and drives the cell production cartridge, wherein the driving base is fixed on a wall structure;
a microscope device capable of observing an object including cells or cell masses;
a conveying apparatus configured to perform
   a focusing function for focusing the microscope device onto the object, and
   a conveyance function to convey the microscope device between an observation location of the microscope device and a standby location of the microscope device, or to convey the cell production cartridge between an observation location of the microscope device and a standby location of the cell production cartridge; and an operating control section that sends the conveying apparatus a command to temporarily move the conveying apparatus from a current position to a relay position and then to move the conveying apparatus to a target position when focusing the microscope device onto the object at the observation location, wherein a first distance from the current position to the relay position is a distance necessary to drive an actuator by a predetermined amount in order to actuate at least one rotation shaft or one translation shaft of the conveying apparatus, and a second distance from the current position to the target position is a shorter distance than the first distance.

2. The microscope observation system according to claim 1, wherein the cell production cartridge comprises a closed system fluid circuit.

3. The microscope observation system according to claim 1, wherein the culture vessel protrudes in a horizontal direction from a main body of the cell production cartridge.

* * * * *